(12) United States Patent
Sicari et al.

(10) Patent No.: US 7,424,126 B2
(45) Date of Patent: Sep. 9, 2008

(54) FIX MOUNTED EARPHONE JACK

(75) Inventors: Nancy Sicari, Islip Terrace, NY (US);
David M. Bauer, Head of the Harbor, NY (US); Adelson Jules, Cambria Heights, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 420 days.

(21) Appl. No.: 10/855,910

(22) Filed: May 27, 2004

(65) Prior Publication Data

US 2005/0265573 A1 Dec. 1, 2005

(51) Int. Cl.
*H04R 25/00* (2006.01)

(52) U.S. Cl. ........................ 381/384; 381/374

(58) Field of Classification Search ................ 381/384, 381/370, 374, 183, 71.6, 74; 455/572, 607; 379/185; 368/93; 16/2.5; 439/281, 358, 439/607
See application file for complete search history.

(56) References Cited

U.S. PATENT DOCUMENTS

| | | | | |
|---|---|---|---|---|
| 2,895,003 A * | 7/1959 | Rapata | ........................ | 16/2.5 |
| 3,996,500 A * | 12/1976 | Coules | ........................ | 361/748 |
| 4,687,276 A * | 8/1987 | Stockmaster | ................ | 439/557 |
| 5,118,309 A * | 6/1992 | Ford | ...................... | 439/620.21 |
| 5,628,653 A * | 5/1997 | Haas et al. | .................. | 439/607 |
| 5,664,015 A * | 9/1997 | Ford et al. | ............. | 379/433.01 |
| 6,101,087 A * | 8/2000 | Sutton et al. | ................. | 439/638 |
| 6,132,257 A * | 10/2000 | Wang et al. | ................. | 361/837 |
| 6,165,002 A * | 12/2000 | Kalis | .......................... | 439/358 |
| 6,394,831 B1 * | 5/2002 | Bowers et al. | ............. | 439/327 |
| 7,034,678 B2 * | 4/2006 | Burkley et al. | ......... | 340/539.13 |
| 7,123,936 B1 * | 10/2006 | Rydbeck et al. | ............. | 455/557 |
| 2002/0030871 A1 * | 3/2002 | Anderson et al. | ........... | 359/150 |
| 2002/0051533 A1 * | 5/2002 | Edelist et al. | ................ | 379/441 |
| 2003/0174848 A1 * | 9/2003 | Hoagland | ..................... | 381/74 |

* cited by examiner

*Primary Examiner*—Brian Ensey
(74) *Attorney, Agent, or Firm*—Fay Kaplun & Marcin, LLP

(57) ABSTRACT

An earphone jack, comprising an attachment assembly including a pin connector for insertion into an earpiece receptacle of a mobile unit, a cord, a portion of the cord being molded to the attachment assembly, the cord being conductively connected to the pin connector and an earphone connector coupled to the cord.

16 Claims, 6 Drawing Sheets

System 1

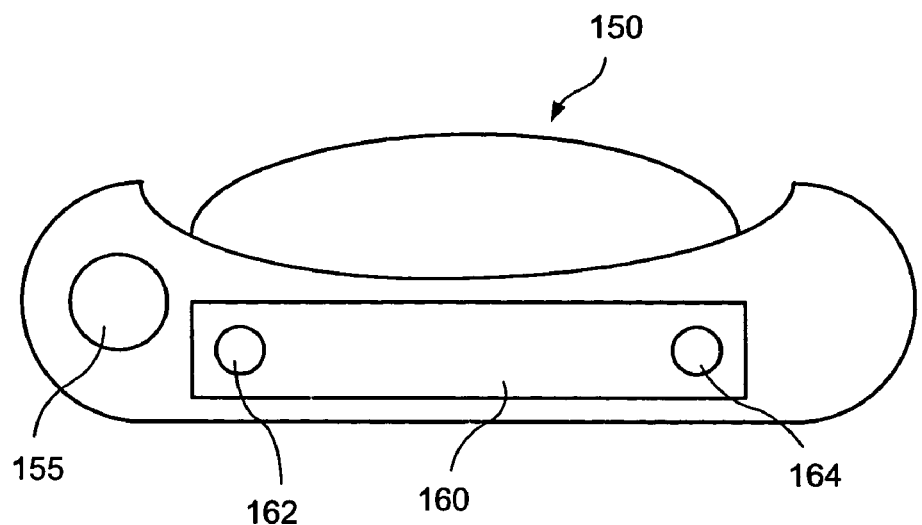
F I G. 5
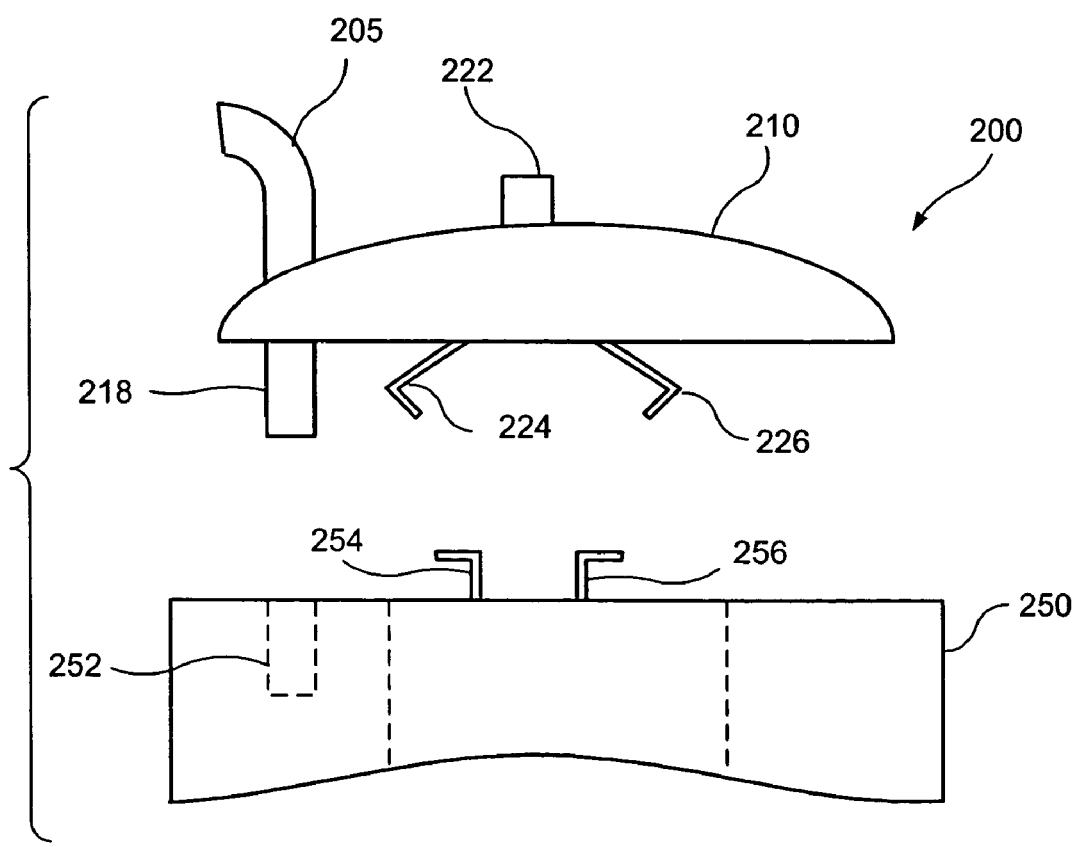
F I G. 6

FIX MOUNTED EARPHONE JACK

BACKGROUND INFORMATION

In a wireless communication network, there may be a plurality of mobile terminals or devices. Such devices may be carried by a user, attached to the user (e.g., by a belt hook, etc.), attached to a user's vehicle (e.g., a forklift, etc.), etc. Depending on the tasks which the user is performing, the user may want to use the mobile device in a hands free manner. A feature which facilitates the use of a mobile device in a hands free mode is the use of an ear phone or headset with the mobile unit. However, standard ear phones have problems because they tend to disconnect from the mobile device and plugging an earphone jack into the mobile device may decrease the industrial rating of the device because the earphone jack does not meet the same standards of ruggedness as the entire device.

SUMMARY OF THE INVENTION

Described is an earphone jack, comprising an attachment assembly including a pin connector for insertion into an earpiece receptacle of a mobile unit, a cord, a portion of the cord being molded to the attachment assembly, the cord being conductively connected to the pin connector and an earphone connector coupled to the cord.

In addition, a mobile computing device, comprising a housing to contain the computing components of the mobile computing device, the housing including a earpiece receptacle, an attachment assembly including a pin connector for insertion into the earpiece receptacle, a cord molded to the attachment assembly, the cord being conductively connected to the pin connector and an earphone connector coupled to the cord.

Furthermore, an attachment assembly for an earphone jack, comprising a pin connector to insert into a earpiece receptacle of a mobile unit and a connection assembly to semi-permanently couple the attachment assembly to a housing of the mobile unit, wherein, when the attachment assembly is coupled to the housing, an area of attachment is sealed from penetration of environmental contaminants.

BRIEF DESCRIPTION OF THE DRAWINGS

FIG. 5 shows a front view of the mobile unit without the exemplary fixed mounted earphone jack;

FIG. 6 shows a second exemplary embodiment of a fixed mounted earphone jack according to the present invention;

DETAILED DESCRIPTION

Figure 1:
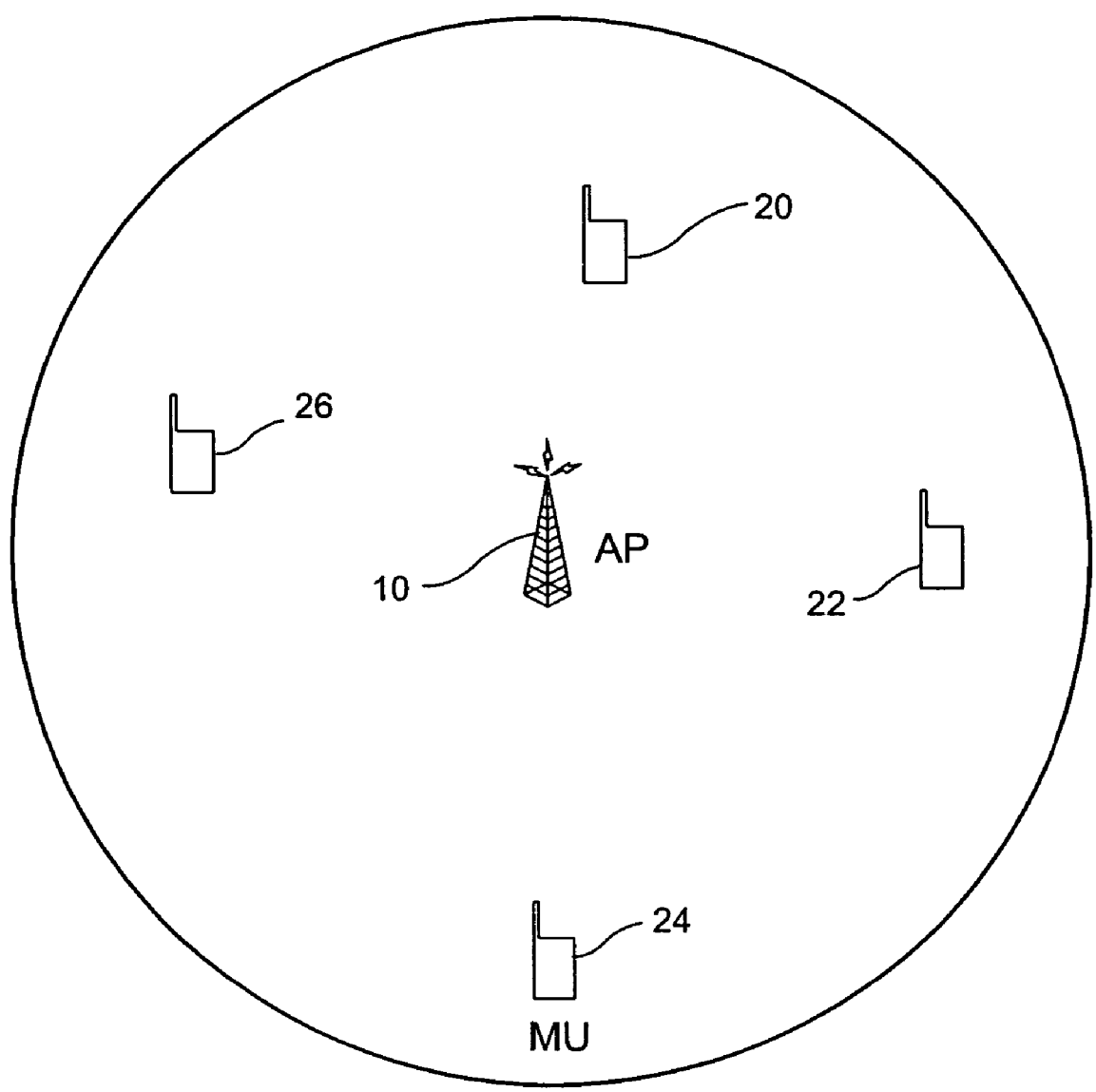
FIG. 1 shows an exemplary system including an access point ("AP") and a plurality of mobile units.

The present invention may be further understood with reference to the following description and the appended drawings, wherein like elements are provided with the same reference numerals. FIG. 1 shows an exemplary system 1 including an access point 10 and a plurality of mobile units 20-26. The system 1 may include a variety of data and voice services including broadband services such as high quality streaming video or audio. It may also include realtime applications such as telephony or video phones.

The mobile units 20-26 may be any type of mobile computing or processor based device that are adapted to operate in the system 1. The access point 10 may be, for example, a router, switch or bridge that connects the wireless and wired networks. Those of skill in the art will understand that the system 1 is only exemplary and is simply used to place the exemplary embodiments of the present invention in context. The present invention is to be implemented on the mobile units of the system 1 and the configuration of the wireless communications network for which the mobile units are deployed is not relevant to the present invention.

As described previously, a problem with connecting earpieces to mobile units is that they become easily detached from the mobile unit. The exemplary embodiment of the present invention provides a fixed mounted earpiece jack which prevents the earpiece jack from becoming detached from the mobile unit. This allows a user of the mobile unit to use the mobile unit in a hands free manner without the worry of the earpiece jack becoming disconnected from the mobile unit and the user losing audio.

Figure 2:
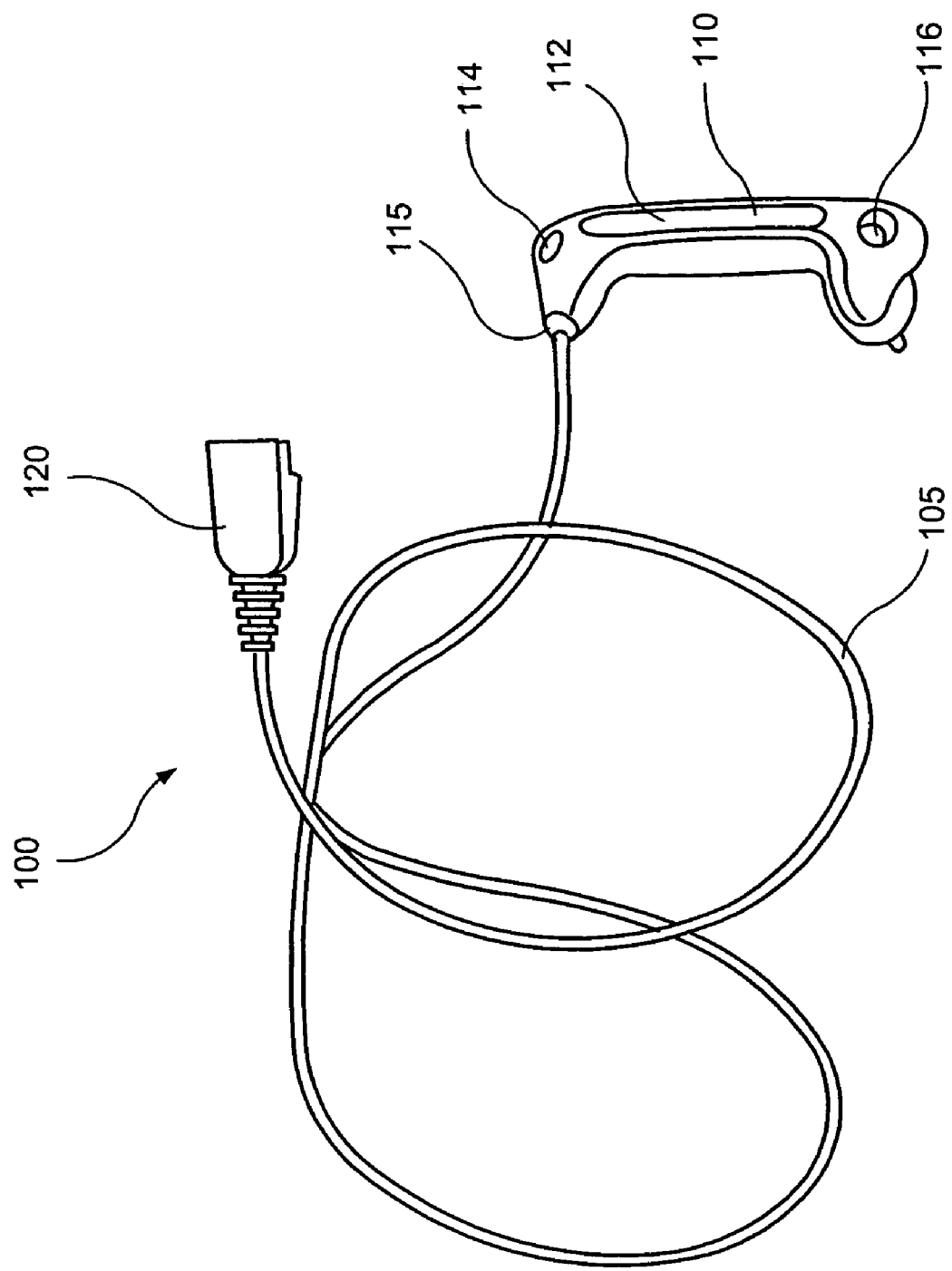
FIG. 2 shows a first view of an exemplary embodiment of a fixed mounted earphone jack according to the present invention.

FIG. 2 shows a first view of an exemplary embodiment of a fixed mounted earphone jack 100. The earphone jack 100 includes an attachment assembly 110, a cord 105 and an earphone connector 120. The attachment assembly 110 is the portion of the earphone jack 100 which is attached to the mobile unit. In this exemplary embodiment, the attachment assembly 110 is a molded plastic assembly, but it may be constructed of any rugged material which protects the earphone jack 100 and the mobile unit as described herein.

FIG. 2 shows a top view of the attachment assembly 110, i.e., the face 112 of the attachment assembly 110 which will face away from the mobile unit to which it will be connected. The screw holes 114 and 116 may be threaded or unthreaded vias through which screws are inserted, with the head of the screw holding the attachment assembly 110 in place. The attachment assembly 110 includes screw holes 114 and 116 for attachment of the earphone jack 100 to the mobile unit. As shown in FIG. 2, the cord 105 is integrally molded to the attachment assembly 110 at location 115 such that the cord 105 is not detachable from the attachment assembly 110.

The cord 105 conducts the audio signal from the mobile unit to an earphone (not shown). The earphone is connected to the earphone jack 100 via the earphone connector 120. The earphone may be plugged into the earphone connector 120 such that the earphone is detachably connected. Since the earphone jack 100 of the present invention is a fixed mounted earphone jack that is semi-permanently attached to the mobile unit, e.g., the earphone jack 100 is detachable by unscrewing the screws placed through screw holes 114 and 116, the earphone connector 120 may include a break-away or quick release connector such that the earphone may be released for safety purposes.

Figure 3:
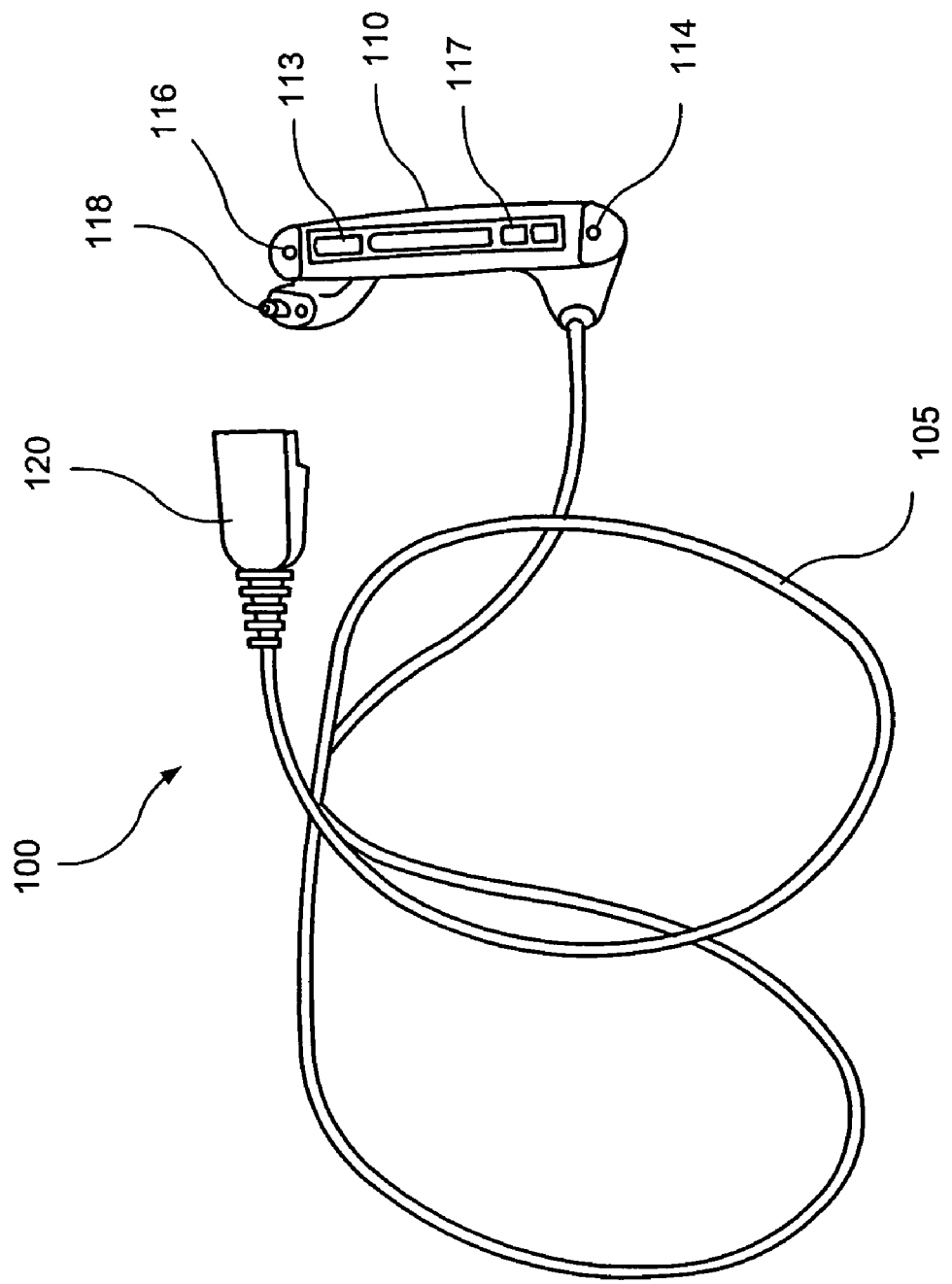
FIG. 3 shows a second view of an exemplary embodiment of a fixed mounted earphone jack according to the present invention.

FIG. 3 shows a second view of an exemplary embodiment of a fixed mounted earphone jack 100. The earphone jack 100 includes the attachment assembly 110, the cord 105 and the earphone connector 120 as described with reference to FIG. 2. However, FIG. 3 shows a bottom view of the attachment assembly 110, i.e., the face 113 of the attachment assembly 110 which will face the surface of the mobile unit to which it will be connected.

This view of the attachment assembly 110 shows the opposite side of the screw holes 114 and 116, a fitted molded portion 117 and a pin connector 118. As described above, the attachment assembly 110 may be connected to the mobile unit using screws attached through the screw holes 114 and 116. The fitted molded portion 117 will be described in greater detail below, but is used to fit within a recessed portion of the mobile unit.

The pin connector 118 fits into an earpiece receptacle on the mobile unit. A standard earpiece receptacle on a mobile unit is a cylindrical female recess made of a conducting material. The pin connector 118 is a cylindrical male conductor (or other shape) which fits into the female recess of the mobile unit. The pin connector 118 is conductively connected to the cord 105 within the attachment assembly 110. Thus, the pin connector 118 conducts the signal from the mobile unit to the cord 105.

Figure 4:
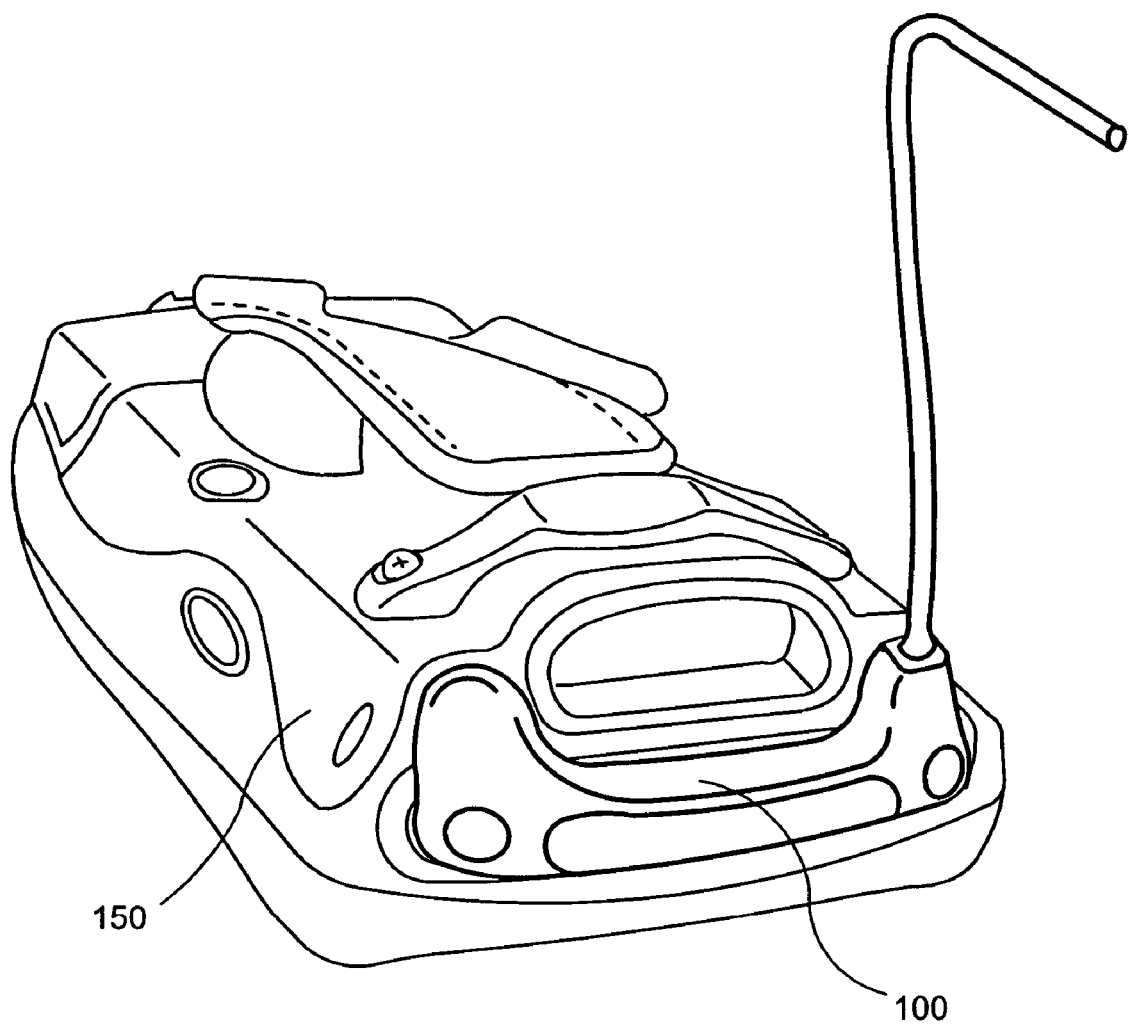
FIG. 4 shows an exemplary mobile unit including an exemplary fixed mounted earphone jack according to the present invention.

FIG. 4 shows an exemplary mobile unit 150 including an exemplary fixed mounted earphone jack 100. FIG. 5 shows a front view of the mobile unit 150 without the fixed mounted earphone jack 100. In this exemplary embodiment, the mobile unit 150 includes an earpiece receptacle 155 as described above and a compact flash card holder door 160 which covers a recess for the insertion of a compact flash card. The compact flash card holder door 160 includes screw holes 162 and 164 to attach the door 160 to the mobile unit 150. The screw holes 162 and 164 lead to threaded screw holes (not shown) in the housing of the mobile unit 150 which secure the screws to the housing of the mobile unit 150.

The fixed mounted earphone jack 100 may be connected to the mobile unit by inserting the pin connector 118 into the earpiece receptacle 155. The pin connector 118 may be sized to cause some compression on the pin connector when inserted into the earpiece receptacle 155 to establish electrical contact between the conducting surfaces. The screw holes 114 and 116 of the earphone jack 100 are also lined up with the screw holes in the housing of the mobile unit 150 corresponding to the screw holes 162 and 164 of the door 160. Screws are then used to semi-permanently attach the attachment assembly 110 to the mobile unit 150.

The door 160 may be removed from the mobile unit 150 because the earphone jack 100 will also perform the function of the door, e.g., holding the compact flash card in place, covering the recess, etc. As described above, the earphone jack 100 may include the fitted molded portion 117 which may also fit into the recess in the mobile unit to provide a secure fitting and to seal any gaps which could lead to dust, water, etc. penetrating into the recess of the mobile unit.

Those of skill in the art will understand that the exemplary earphone jack 100 is shown as molded in the shape of the end of the exemplary mobile unit 150. Different embodiments of an attachment assembly of an earphone jack according to the present invention may have various shapes based on the mobile unit to which the earphone jack will be attached. Thus, the attachment assembly may be molded or formed to follow a contour of the mobile unit to which it is attached. Furthermore, the attachment assembly may assume a shape based on the functionality of covering recesses or other openings in the mobile unit in order for the mobile unit to achieve a desired industrial rating.

Referring back to FIG. 4, it can be seen that the earphone jack 100 appears to be an integral part of the mobile unit 150 after it has been attached. The mobile unit 150 may have an IP54 rating as defined by the IEC 60529 Standard. However, attaching a standard earphone jack may change or alter that rating. Because the earphone jack 100 is semi-permanently attached to the mobile unit 150, thereby becoming an integral part of the mobile unit 150, the mobile unit may maintain the IP 54 rating because the earphone jack 100 covers the recess and other exposed portions of the mobile unit 150. Thus, the mobile unit 150 continues to be protected against environmental contaminants (e.g., dirt, dust, water, etc.).

To further this goal, the attachment assembly 110 may also include a gasket material which is interposed between the attachment assembly 110 and the housing of the mobile unit 150 to protect from any contaminants penetrating between the attachment assembly 110 and the mobile unit 150.

In addition, there may be other manners of attaching the earphone jack to the mobile unit. In the above described example, the mobile unit had threaded screw holes which were used to attach the earphone jack. Other mobile units may have threaded screw holes in different locations which can be used for attachment. The attachment assembly may be altered accordingly to provide for screw holes at various locations.

FIG. 6 shows a second exemplary embodiment of a fixed mounted earphone jack 200 which may be attached to the mobile unit 250. FIG. 6 only shows a portion of the mobile unit 250 to which the earphone jack 200 will be attached and shows an alternative manner of attaching the earphone jack 200 to the mobile unit 250. The earphone jack 200 includes an attachment assembly 210, a cord 205 and an earphone connector (not shown). The attachment assembly 210 of the earphone jack 200 includes a pin connector 218, a button 222 and a set of clips 224 and 226.

The mobile unit 250 includes an earpiece receptacle 252 and a set of clips 254 and 256. The pin connector 218 fits into the earpiece receptacle 252. The button 222 is pressed causing the clips 224 and 226 to fan out as shown in FIG. 6. When the earphone jack 200 contacts the mobile unit 250, the button 222 may be released causing the clips 224 and 226 to be drawn toward each other and engage the clips 254 and 256 of the mobile unit 250. Thus, the earphone jack 200 is semi-permanently attached to the mobile unit 250 using the corresponding clips. The earphone jack 200 may be removed from the mobile unit 250 by pressing the button 222 which causes the clips 224 and 226 to disengage from the clips 254 and 256.

Figure 7:
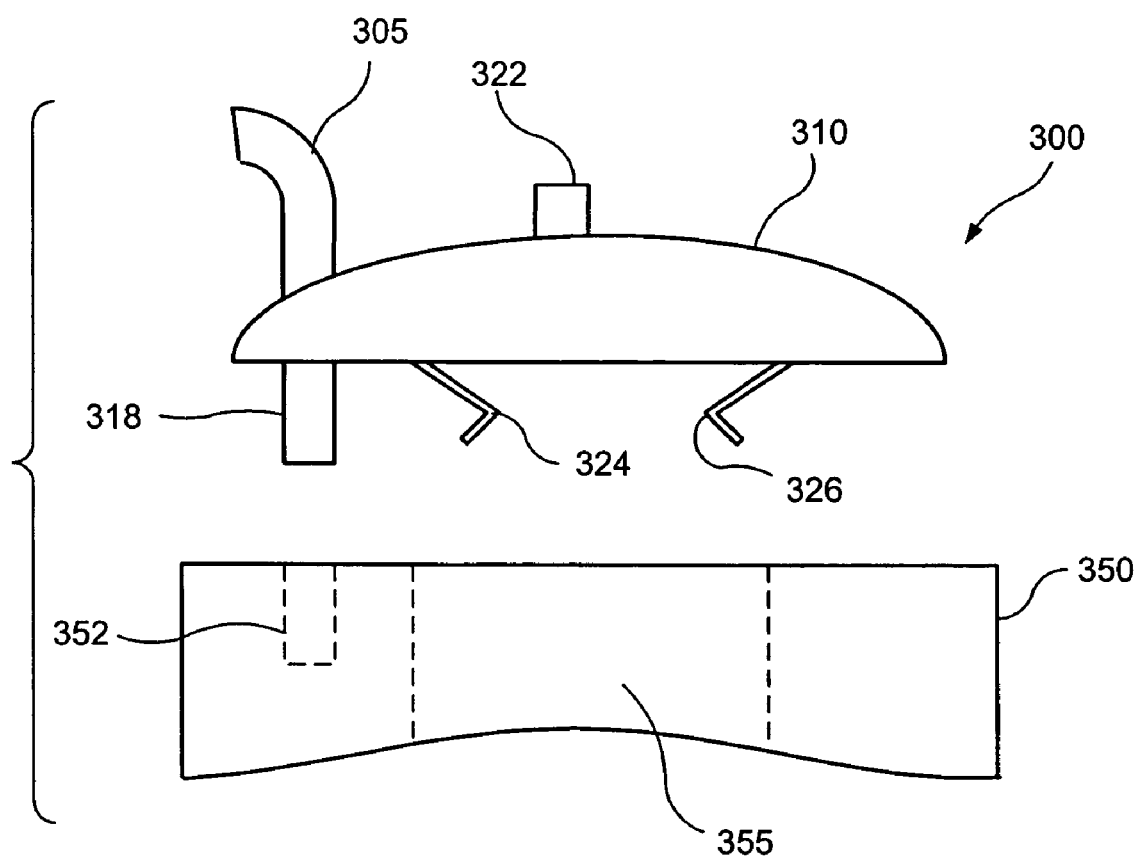
FIG. 7 shows a third exemplary embodiment of a fixed mounted earphone jack according to the present invention.

FIG. 7 shows a third exemplary embodiment of a fixed mounted earphone jack 300 which may be attached to the mobile unit 350. FIG. 7 only shows a portion of the mobile unit 350 to which the earphone jack 300 will be attached and shows another alternative manner of attaching the earphone jack 300 to the mobile unit 350. The earphone jack 300 includes an attachment assembly 310, a cord 305 and an earphone connector (not shown). The attachment assembly 310 of the earphone jack 300 includes a pin connector 318, a button 322 and a set of clips 324 and 326.

The mobile unit 350 includes an earpiece receptacle 352 and a recess area 355. The recess area 355 may be any recess used for the attachment of peripheral devices to the mobile unit 350, such as the recess described above for the placement of the compact flash card. The pin connector 318 fits into the earpiece receptacle 352. The button 322 is pressed causing the clips 324 and 326 to move toward each other as shown in FIG. 7. When the earphone jack 300 contacts the mobile unit 350, the clips 324 and 326 are inserted into the recess 355 of the mobile unit 350. The button 322 may be released causing the clips 324 and 326 to move away from each other and engage an area adjacent to the recess, thereby holding the earphone jack 300 in place. Thus, the earphone jack 300 is semi-permanently attached to the mobile unit 350 using the clips 324 and 326 and the recess 355. The earphone jack 300 may be released by pressing the button 322 to disengage the clips.

The above provided several examples of manners by which the earphone jack of the present invention may be semi-permanently attached to a mobile unit. However, those of skill in the art will understand that there are numerous other manners of semi-permanently attaching a earphone jack according to the present invention to a mobile unit.

The present invention has been described with the reference to the above exemplary embodiments. One skilled in the art would understand that the present invention may also be successfully implemented if modified. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. An earphone jack, comprising:
   an attachment assembly including a pin connector for insertion into an earpiece receptacle of a mobile unit, the attachment assembly further including a clip to semi-permanently attach the attachment assembly to the mobile unit;
   a cord, a portion of the cord being molded to the attachment assembly, the cord being conductively connected to the pin connector; and
   an earphone connector including a first end electrically coupled to the cord and a second end having a structure adapted to couple directly to an earphone.

2. The earphone jack of claim 1, wherein the attachment assembly further includes a via through which a screw is placed to semi-permanently attach the attachment assembly to the mobile unit.

3. The earphone jack of claim 1, wherein the attachment assembly further includes a fitted molded portion for insertion into a recess of the mobile unit.

4. The earphone jack of claim 1, wherein the earphone connector is releaseably attached to an earphone.

5. The earphone jack of claim 1, wherein the attachment assembly is a molded material which, when attached to the mobile unit, follows a contour of the mobile unit.

6. The earphone jack of claim 1, wherein the attachment assembly further includes a gasket which seals an area of attachment between the attachment assembly and the mobile unit.

7. The earphone jack of claim 1, wherein the attachment assembly comprises a molded plastic material.

8. A mobile computing device, comprising:
   a housing to contain the computing components of the mobile computing device, the housing including a earpiece receptacle;
   an attachment assembly including a pin connector for insertion into the earpiece receptacle, the attachment assembly further including a clip to semi-permanently attach the attachment assembly to the mobile unit;
   a cord molded to the attachment assembly, the cord being conductively connected to the pin connector; and
   an earphone connector including a first end electrically coupled to the cord and a second end having a structure adapted to couple directly to an earphone.

9. The mobile computing device of claim 8, further comprising:
   an earphone coupled to the earphone connector for receiving audio signals from the computing components.

10. The mobile computing device of claim 9, wherein the coupling between the earphone and the earphone connector is a quick release coupling.

11. The mobile computing device of claim 8 having an IP (International Protection Rating) of 54.

12. The mobile computing device of claim 8, wherein the housing further includes a threaded via and the attachment assembly includes a via, wherein a screw is placed through the via of the attachment assembly and threaded into the threaded via of the housing to semi-permanently couple the attachment assembly to the housing.

13. The mobile computing device of claim 8, wherein the housing further includes a recess and the attachment assembly includes a fined molded portion which fits into the recess.

14. An attachment assembly for an earphone jack, comprising:
   a pin connector to insert into a earpiece receptacle of a mobile unit;
   a connection assembly to semi-permanently couple the attachment assembly to a housing of the mobile unit, wherein, when the attachment assembly is coupled to the housing, an area of attachment is sealed from penetration of environmental contaminants, wherein the connection assembly includes a via for insertion of a screw to semi-permanently couple the attachment assembly to the housing, wherein the connection assembly includes a fitted molded portion for insertion into a recess of the housing.

15. The attachment assembly of claim 14, further comprising:
   a gasket material facilitating the sealing of the attachment area.

16. The attachment assembly of claim 14, further comprising:
   a cord coupling assembly to integrally couple a cord to the attachment assembly.

* * * * *